United States Patent [19]

Harless

[11] Patent Number: 5,003,236
[45] Date of Patent: Mar. 26, 1991

[54] METHOD OF AND APPARATUS FOR MOVING ELECTRICALLY POWERED MINING EQUIPMENT

[75] Inventor: Ronnie B. Harless, Madison, W. Va.
[73] Assignee: Peabody Coal Company, St. Louis, Mo.
[21] Appl. No.: 473,658
[22] Filed: Feb. 1, 1990
[51] Int. Cl.$^5$ ............................................... B60K 1/00
[52] U.S. Cl. ...................................... 318/139; 180/202
[58] Field of Search .................... 318/139, 568.12, 563, 318/568.24; 180/14.3, 19.3, 53.5, 60, 65.1, 202, 242, 317, 298, 65.3; 307/46, 48, 64, 66, 80, 9, 10.1-10.8

[56] References Cited

U.S. PATENT DOCUMENTS

| | | | |
|---|---|---|---|
| 2,282,749 | 5/1942 | Russell | 262/28 |
| 2,638,996 | 5/1953 | Vanderzee | 180/2 |
| 3,336,997 | 8/1967 | Yates et al. | 180/65 |
| 4,397,365 | 8/1983 | Harbe et al. | 180/68.5 |

Primary Examiner—William M. Shoop, Jr.
Assistant Examiner—A. Jonathan Wysocki
Attorney, Agent, or Firm—Senniger, Powers, Leavitt & Roedel

[57] ABSTRACT

A method of moving an electrically powered mining machine between locations that have electric power supplies, the mining machine of the type having at least one electric motor for moving the mining machine, the method including connecting a temporary power unit to the motor on the mining machine and operating the power unit to selectively power the mining machine. The temporary power unit comprises at least one battery, and a relay for selectively making an electrical connection, a connector for connecting the relay to the battery pack, and a connector for connecting the relay to the electric motor for selectively connecting the battery to at least one electric motor on the mining machine to selectively power the electric motor to move the mining machine. At least one of the connectors is long and flexible to permit relative movement between the battery and the mining machine. The power unit also includes a remote control device for operating the relay.

26 Claims, 2 Drawing Sheets

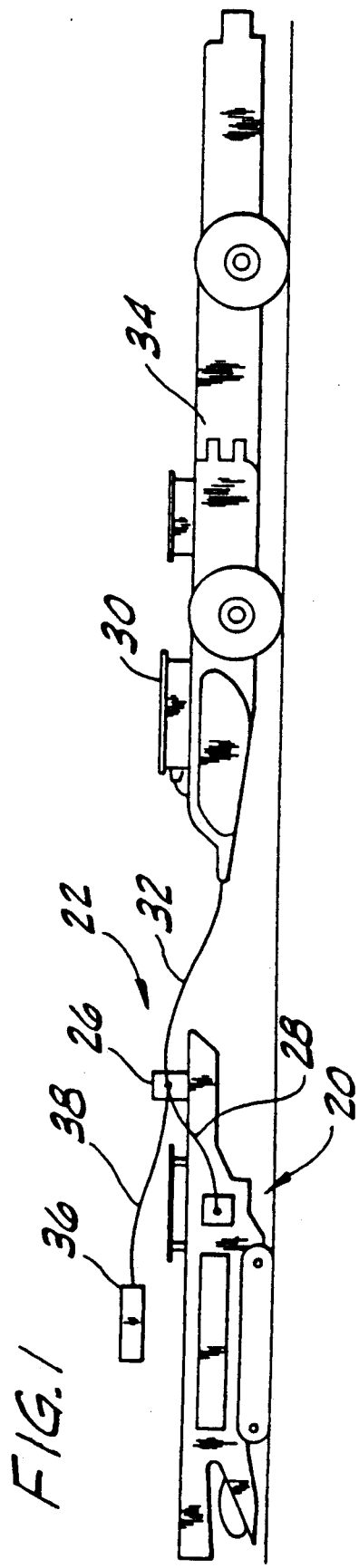
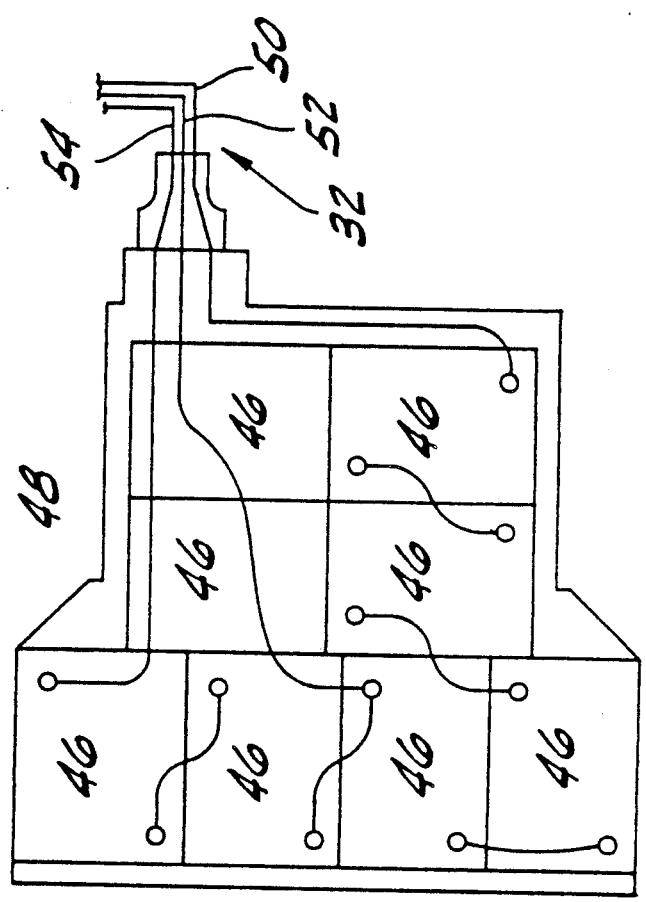
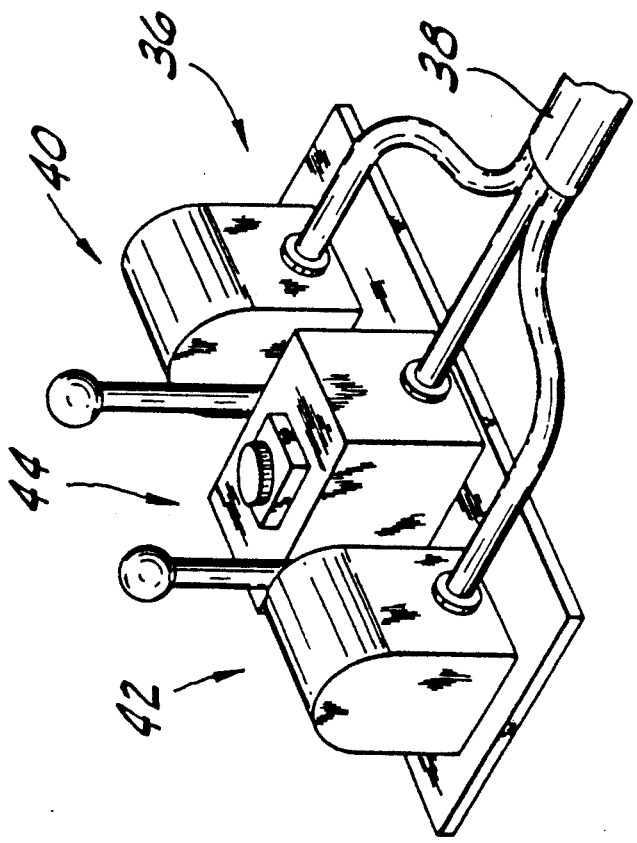

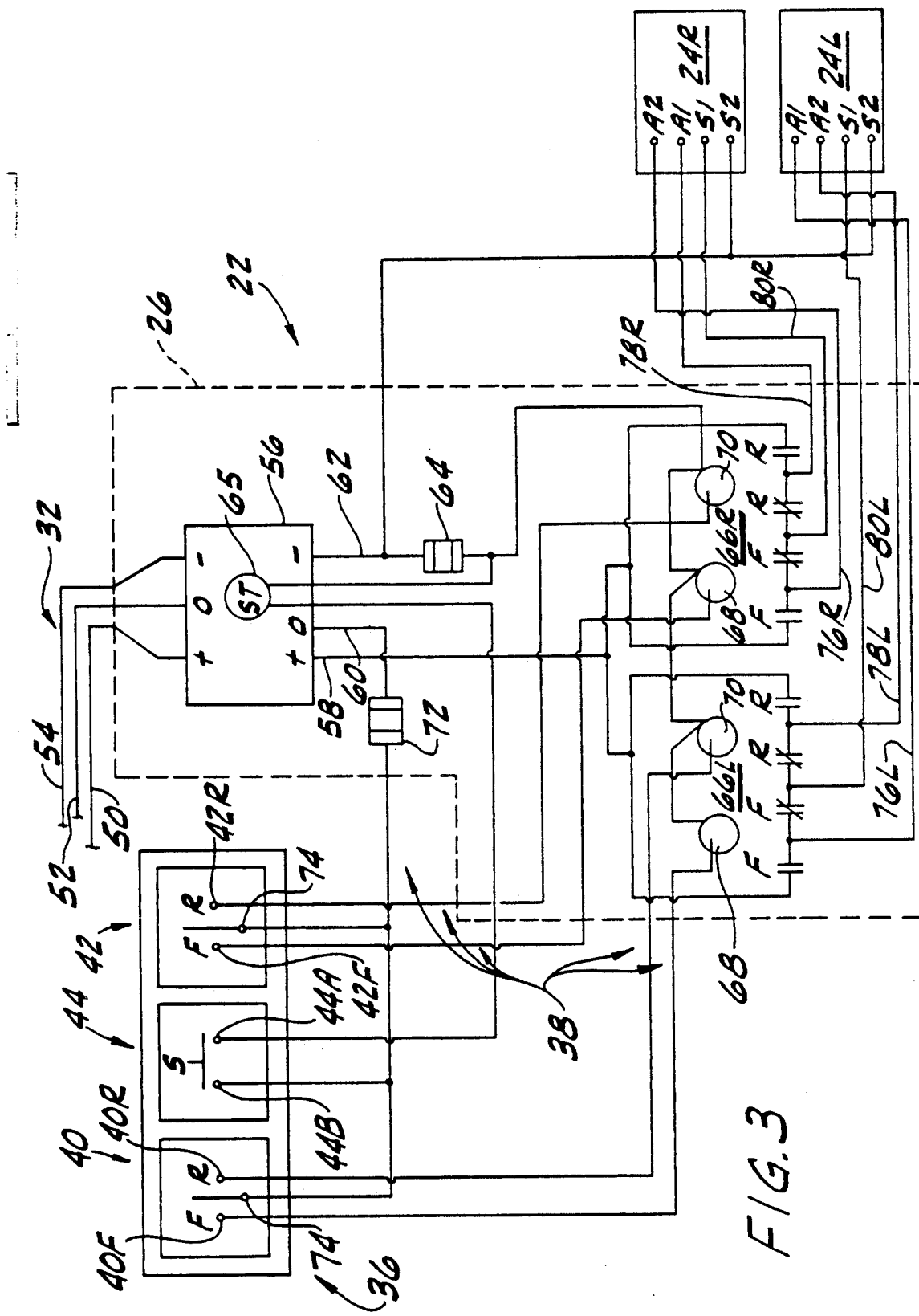
F I G. 3

METHOD OF AND APPARATUS FOR MOVING ELECTRICALLY POWERED MINING EQUIPMENT

BACKGROUND OF THE INVENTION

This invention relates to electrically powered mining machinery and equipment, and in particular to a method of and apparatus for moving electrically powered mining equipment.

A lot of underground mining machinery and equipment, for example the large continuous miners and coal breaker feeders used in coal mines, is electrically powered from external sources. Large cables conduct the electric power to the mining machines from electric power sources provided at the active mining sites. However, these sources are not widely available throughout a mine, and there may be as much as 2,000–4,000 feet between adjacent power sources. Thus, great difficulties arise when it is desired to move the equipment from one mining site to another. Typically, the mining machine is left connected to its original power source, and it is moved toward the next adjacent power source. The machine may be trailing several thousand feet of cable as it moves toward the next power source. When the mining machine reaches the end of its cable, the cable is disconnected from the original power source and carried forward to the next power source. Because of the lengths of cable required, the cable is extremely heavy, and a large crew may be required to handle the cable. They may even need the assistance of one or more battery powered machines. This "leapfrogging" procedure is continued until the mining machine reaches its final destination.

This method of moving mining machinery is extremely time consuming and expensive. It removes very expensive mining machinery from production for long periods of time, and may tie up other auxiliary equipment as well. It likewise diverts personnel from productive tasks. It can be very strenuous work, and separates the workers from each other making communication to coordinate the job difficult.

SUMMARY OF THE INVENTION

It is among the objects of this invention to provide an improved method of moving electrically powered mining equipment that is faster and easier than present methods, and which requires less personnel. It is also among the objects of the present invention to provide an apparatus to facilitate moving underground mining equipment in less time and with less personnel than was previously required.

The method of this invention involves moving an electrically powered mining machine between locations that have electric power supplies. The method relates to mining machines of the type having at least one electric motor for moving the mining machine. Generally, this method comprises the steps of providing a battery pack for the machine having at least one battery, providing selective connecting means between the battery pack and the electric motor for selectively connecting the battery pack and the electric motor, and operating the selective connecting means to selectively power the electric motor to move the mining machine. The method may further comprise the step of providing remote control means for remotely controlling the selective connecting means so that the step of operating the selective connecting means may be carried out remote from the selective connecting means.

The selective connecting means preferably includes a long flexible cable permitting relative movement between the battery pack and the electric motor, and the method preferably comprises the step of transporting the battery pack separately from the mining machine.

The apparatus of this method is adapted to facilitate the transportation of electrically powered mining equipment. The apparatus comprises a portable temporary power unit for providing electric power to the mining machine so that the mining machine can be moved between locations that have electric power supplies. The unit is adapted for use with mining machines of the type having at least one electric motor for moving the mining machine. The power unit generally comprises at least one battery and selective connecting means for selectively connecting the battery to an electric motor on the mining machine. The unit preferably further comprises remote control means for remotely controlling the selective connecting means.

The selective connecting means preferably includes a long flexible cable that permits relative motion between the battery and the mining machine. The selective connecting means preferably also includes at least one relay for selectively connecting the battery to the electric motor. The relay may include means for connecting the battery to the motor to operate the motor forwardly, and means for connecting the battery to the motor to operate the motor in reverse. The remote control means includes means for operating the relay.

Where the electric mining machine has more than one electric motor, the apparatus preferably comprises a plurality of selective connecting means, one for each electric motor. The remote control means preferably includes means for operating each selective connecting means individually.

The method of this invention provides a way of moving electrically powered mining machines that is much faster than the methods presently in use, thereby reducing the time that the mining machine is out of production. The method reduces the amount of accessory equipment required for the move, minimizing the time that this equipment is out of production. The method also reduces the number of workers required to move the equipment, and reduces the strenuous handling of power cables required by the methods presently in use.

Likewise, the apparatus of the present invention facilitates the moving of electrically powered mining machines. With the portable power unit of the present invention, the machinery can be moved much faster, reducing down-time. At most the apparatus requires a single auxiliary machine to carry the battery pack, and therefore does not tie-up a lot of accessory equipment. The power unit reduces the strenuous task of handling power cables, requiring both fewer workers and less worker time.

Thus, the method and apparatus of this invention reduces the loss of equipment time and the diversion of labor from Production, providing substantial savings in equipment and labor.

These and other advantages will be in part apparent and in part pointed out hereinafter.

BRIEF DESCRIPTION OF THE DRAWINGS

FIG. 1 is a side elevation view of a piece of mining equipment being transported according to the method of this invention, with the aid of an apparatus constructed according to the principles of this invention;

FIG. 2 is a perspective view of a remote control device that is part of the apparatus shown in FIG. 1;

FIG. 3A is a schematic view of the battery pack that is part of the apparatus shown in FIG. 1; and FIG. 3B is a schematic view of the rest of the apparatus shown in FIG. 1.

Corresponding reference numerals indicate corresponding parts throughout the several view of the drawings.

DETAILED DESCRIPTION OF THE PREFERRED EMBODIMENT

FIG. 1 is a side elevation view of an electrically powered mining machine 20, shown as it would be transported according to the method of this invention, with the aid of an apparatus, indicated generally as 22, constructed according to the principles of this invention. The mining machine 20 is preferably of the type having one or more d/c electric motors for moving the mining machine. As is common with such machines, as described herein the mining machine 20 has two electric motors, 24L and 24R, on the left and right sides of the machine 20, respectively. The motors 24L and 24R drive wheels on the left and right sides of the machines, respectively.

The apparatus 22 comprises a contactor box 26 that is carried on the mining machine 20, and connected to its d/c electric motors 24 with a cable 28. As shown in FIG. 1, the cable 28 actually connects to a panel on the mining machine which is connected to the motors. The apparatus 22 also comprises a battery pack 30, which is connected to the contactor box 26 by a cable 32. The battery pack 30 is preferably carried by a separate battery powered vehicle 34. Finally, the apparatus 22 comprises a remote control device 36 for controlling the mining machine 20. The remote control device 36 is connected to the contactor box 26 by a cable 38.

The remote control device 36 has three controls: a left motor control 40, a right motor control 42, and a stop button or switch 44. The left and right motor controls 40 and 42 are three position switches with forward, neutral, and reverse positions, and can be operated to cause their respective motors to run forward, to run in reverse, or to stop. By selectively operating controls 40 and 42, an operator can move the mining machine 20 forwardly, rearwardly, or make turns. The stop switch 44 can be operated to quickly stop the motors from running in either direction.

The battery pack 30 comprises a plurality of batteries 46 in an enclosure 48. The batteries 46 are connected in series. Three leads extend from the series of batteries: a positive lead 50, a central lead 52, and a negative lead 54. These three leads are connected separately via cable 32 to a circuit breaker 56 in contactor box 26. The circuit breaker 56 has three inputs, corresponding to each of the leads 50, 52, and 54, and corresponding positive, center, and negative output leads 58, 60, and 62, respectively.

The negative lead 62 is connected directly to one of the contacts S2 of each of the motors 24L and 24R. The negative lead 62 is also connected through a fuse 64 and the shunt trip 65 of circuit breaker 56 to one of the contacts 44A of the stop switch 44. The negative lead 62 is also connected through the fuse 64 to the coils of two relays 66L and 66R, which actuate the left and right motors 24L and 24R, respectively. The relays 66 are normally open and each comprises a forward controlling coil 68 and a reverse controlling coil 70. When the forward controlling coil 68 of relay 66L is actuated, as described below, power is provided to the A1 contact of the motor 24L to run the motor in its forward direction. When the reverse controlling coil 70 of relay 66L is actuated, power is provided to the A2 contact of the motor to run the motor in its reverse direction. (The reverse is true for the relay 66R controlling right motor 24R because the motor is on the opposite side of the mining machine 20 and therefore must run opposite to the left motor 24L to move the machine in the same direction).

The central lead 60 is connected through fuse 72 via cable 38 to the center pole 74 of switches 40 and 42, and to the contact 44B of switch 44.

The coils 68 and 70 of the relays 66 are controlled by the switches 40 and 42. The forward contacts of each of these switches, 40F and 42F, are connected to the coils 68 of their respective relays 66L and 66R. The reverse contacts of each of these switches, 40R and 42R, are connected to the coils 70 of their respective relays 66L and 66R. When the switches 40 and 42 are in their forward positions a complete circuit is made between the negative lead 62 and the center lead 60 through the coils 68, energizing the coils 68 and connecting the positive lead 58 to the motors in such a way that the mining machine 20 moves forward. Likewise when the switches 40 and 42 are in their reverse positions a complete circuit is made between the negative lead 62 and the center lead 60 through the coils 70, energizing the coils 70 and connecting the positive lead 58 to the motors in such a way that the mining machine 20 moves in reverse.

Leads 76L and 78L extend from relay 66L to leads A1 and A2 of motor 24L, respectively. Similarly leads 76R and 78R extend from relay 66R to leads A2 and A1 of motor 24R, respectively. This reverse in polarity accounts for the fact that the motors are on opposites sides of the mining machine 20, and therefore must operate in opposite directions to move the machine in the same direction. Leads 80L and 80R connect the relays 66L and 66R to the terminals S1 of the motors 24L and 24R, respectively. The relay 66L connects the positive lead 58 to lead 76L when its coil 68 is energized, and connects the positive lead 58 to lead 78L when its coil 70 is energized. The relay 66R connects the positive lead 58 to lead 76R when its coil 68 is energized, and connects the positive lead 58 to lead 78R when its coil 70 is energized. Thus when the coils 68 of the relays 66 are energized, the motors are powered to move the machine forward, and when the coils 70 of the relays are energized, the motors are powered to move the machine rearwardly.

The cable 32, the contactor box 26, and more particularly the relays 66, and the cable 28 comprise selective connecting means for selectively connecting the battery to at least one electric motor on the mining machine to selectively power the electric motor to move the mining machine 20. Preferably one of the cables 32 or 28, and more preferably cable 32 is long and flexible to permit relative movement between the battery pack and the mining machine.

OPERATION

The device is quickly installed for use by putting the contactor box 26 on the mining machine 20, and putting the remote control 36 in position where in can be operated by the operator. The battery pack 30 can be mounted on the machine as well, but because of its size it is more conveniently carried on a separate battery powered vehicle 34. When the operator moves the switches 40 and 42 on the remote control 36 to their forward positions, the coils 68 in each of the relays 66L and 66R are energized. This connects the positive lead 58 to contact A1 of motor 24L and to contact A2 of motor 24R. When the operator moves the switches 40 and 42 to their reverse positions, the coils 70 in each of the relays 66L and 66R are energized. This connects the positive lead 58 to contact A2 of motor 24L and to contact A1 of motor 24R. When the operator moves the switches 40 and 42 to their neutral positions, neither of the coils of the relays are energized, and power is not provided to the motors. The machine can be steered by actuating one switch and not the other or by actuating the switches in opposite directions. When the operator hits the stop switch 44, current flows through the shut trip 65 of the circuit breaker 56, tripping the circuit breaker and shutting off all power to the motors. The speed of the mining machine can be controlled by varying the number of batteries 46 connected in series in container 48. Generally, the voltage used will be 240V, achieved by connecting 20 12V batteries in series. However, by connecting fewer batteries, a lower voltage can be obtained, reducing the speed of the mining machine when it is connected to apparatus 22.

Thus the device provides a convenient way to move mining equipment, without the laborious and time-consuming methods heretofore used.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A portable temporary power unit for temporarily providing electric power too a mining machine of the type having at least one electric motor for moving the mining machine which during normal operation is connected to a fixed electric power supply, the power unit being adapted to be temporarily connected to the mining machine so that the mining machine can be moved between locations in the mine that have fixed electric power supplies, the power unit comprising:
    at least one battery;
    selective connecting means for selectively connecting the battery to at least one electric motor on the mining machine to selectively power the electric motor to move the mining machine.

2. The power unit according to claim 1, wherein the selective connecting means includes a long flexible cable that permits relative movement between the battery and the mining machine while the two are connected, the cable being sufficiently long to permit the mining machine and the battery to be moved separately.

3. The power unit according to claim 1 further comprising remote control means for remotely controlling the selective connecting means.

4. The power unit according to claim 1 wherein the selective connecting means includes at least one relay for selectively connecting and disconnecting the battery to an electric motor.

5. The power unit according to claim 4 wherein the relay includes means for connecting the battery to the motor to operate it forwardly and means for connecting the battery to the motor to operate it in reverse.

6. The power unit according to claim 5 further comprising remote control means for remotely controlling the relay to connect the battery to the motor to operate the motor forwardly and in reverse.

7. The power unit according to claim 6 adapted for use with a mining machine having at least two electric motors, the power unit comprising a relay for each electric motor, and the remote control means comprising means for operating each relay individually.

8. A portable temporary power unit for temporarily providing electric power to a mining machine of the type having at least one electric motor for moving the mining machine which during normal operation is connected to a fixed electric power supply, the power unit being adapted to be temporarily connected to the mining machine so that the mining machine can be moved between locations in the mine that have fixed electric power supplies, the power unit comprising:
    a battery pack having at least one battery;
    selective connecting means for selectively connecting the battery to at least one electric motor on the mining machine to selectively power the electric motor to move the mining machine; and
    remote control means for remotely controlling the selective connecting means to provide power to the electric motor.

9. The power unit according to claim 8 wherein the selective connecting means comprises a relay for selectively making an electrical connection, a connector for connecting the relay to the battery pack, and a connector for connecting the relay to the electric motor.

10. The power unit according to claim 9 wherein at least one of the connectors comprises a long flexible cable to permit relative movement between the battery pack and the mining machine while the two are connected, the cable being sufficiently long to permit the mining machine and the battery to be moved separately.

11. The power unit according to claim 9 wherein the relay includes means for connecting the battery pack to the motor to operate it forwardly and means for connecting the battery pack to the motor to operate it in reverse.

12. The power unit according to claim 11 wherein the remote control means includes a switch for remotely controlling the relay to connect the battery to the motor to operate the motor forwardly and in reverse.

13. The power unit according to claim 12 adapted for use with a mining machine having at least two electric motors, the power unit comprising a relay for each electric motor, and the remote control means comprising means for operating each relay individually.

14. In combination with a mining machine of the type having at least one electric motor for moving the mining machine which during normal operation is connected to a fixed electric power supply, a portable temporary power unit for temporarily providing electric power to the mining machine, the power unit being adapted to be temporarily connected to the mining machine so that the mining machine can be moved between locations in the mine that have fixed electric power supplies, the power unit comprising:
    a battery pack having at least one battery;
    selective connecting means for selectively connecting the battery too at least one electric motor on the mining machine to selectively power the electric motor to move the mining machine; and remote control means for remotely controlling the selective connecting means to provide power to the electric motor.

15. The combination according to claim 14 wherein the selective connecting means comprises a relay for selectively making an electrical connection, a connector for connecting the relay to the battery pack, and a connector for connecting the relay to the electric motor.

16. The combination according to claim 15 wherein at least one of the connectors comprises a long flexible cable to permit relative movement between the battery pack and the mining machine while the two are connected, the cable being sufficiently long to permit the mining machine and the battery to be moved separately.

17. The combination according to claim 16 wherein the relay includes means for connecting the battery pack to the motor to operate it forwardly and means for connecting the battery pack to the motor to operate it in reverse.

18. The combination according to claim 17 wherein the remote control means includes a switch for remotely controlling the relay to connect the battery to the motor to operate the motor forwardly and in reverse.

19. The combination according to claim 14 wherein the mining machine includes at least two electric motors, and wherein the selective connecting means comprises means for individually selectively connecting each motor to the battery pack.

20. The combination according to claim 19 wherein the selective connecting means comprises a- relay for each electric motor for selectively making an electrical connection, a connector for connecting each relay to the battery pack, and a connector for connecting each relay to its respective electric motor.

21. The combination according to claim 20 wherein at least one of the connectors comprises a long flexible cable to permit relative movement between the battery pack and the mining machine while the two are connected, the cable being sufficiently long to permit the mining machine and the battery to be moved separately.

22. The combination according to claim 20 wherein each relay includes means for connecting the battery pack to the motor to operate it forwardly and means for connecting the battery pack to the motor to operate it in reverse.

23. The combination according to claim 22 wherein the remote control means includes a switch for each relay for remotely controlling each relay to connect the battery to the motor to operate the motor forwardly and in reverse.

24. A method of moving an electrically powered mining machine between locations in a mine that have fixed electric power supplies, the mining machine of the type having at least one electric motor for moving the mining machine which during normal operation is connected to a fixed electric power supply, the method comprising:

providing a battery pack having at least one battery;

disconnecting the electric motor on the mining machine from the fixed electric power supply;

connecting the battery pack to at least one electric motor on the mining machine with a selective connecting means;

operating the selective connecting means to selectively power the electric motor to move the mining machine; and disconnecting the battery pack from the electric motor and reconnecting the electric motor to another fixed electric power supply.

25. The method according to claim 24 wherein the selective connecting means includes a long flexible cable permitting relative movement between the battery pack and the motor while the two are connected, the cable being sufficiently long to permit the mining machine and the battery to be moved separately, the method further comprising the step of transporting the battery pack separately from the mining machine.

26. The method according to claim 24 further comprising the step of providing a remote control means for remotely controlling the selective connecting means, and wherein the step of operating the selective connecting means is done remotely from the selective connecting means.

* * * * *